PEAK DETECTING AND RESHAPING CIRCUIT

Filed Jan. 31, 1962

2 Sheets-Sheet 1

SUNG P. CHUR
INVENTOR.

BY Nathan N. Kallman
ATTORNEY

June 1, 1965 SUNG PAL CHUR 3,187,199

PEAK DETECTING AND RESHAPING CIRCUIT

Filed Jan. 31, 1962

2 Sheets-Sheet 2

SUNG P. CHUR
INVENTOR.

BY Nathan N. Kallman

ATTORNEY 3,187,199

PEAK DETECTING AND RESHAPING CIRCUIT

Sung Pai Chur, Los Angeles, Calif., assignor to Ampex Corporation, Redwood City, Calif., a corporation of California Filed Jan. 31, 1962, Ser. No. 170,117
5 Claims. (Cl. 307—88.5)

Figure 1:
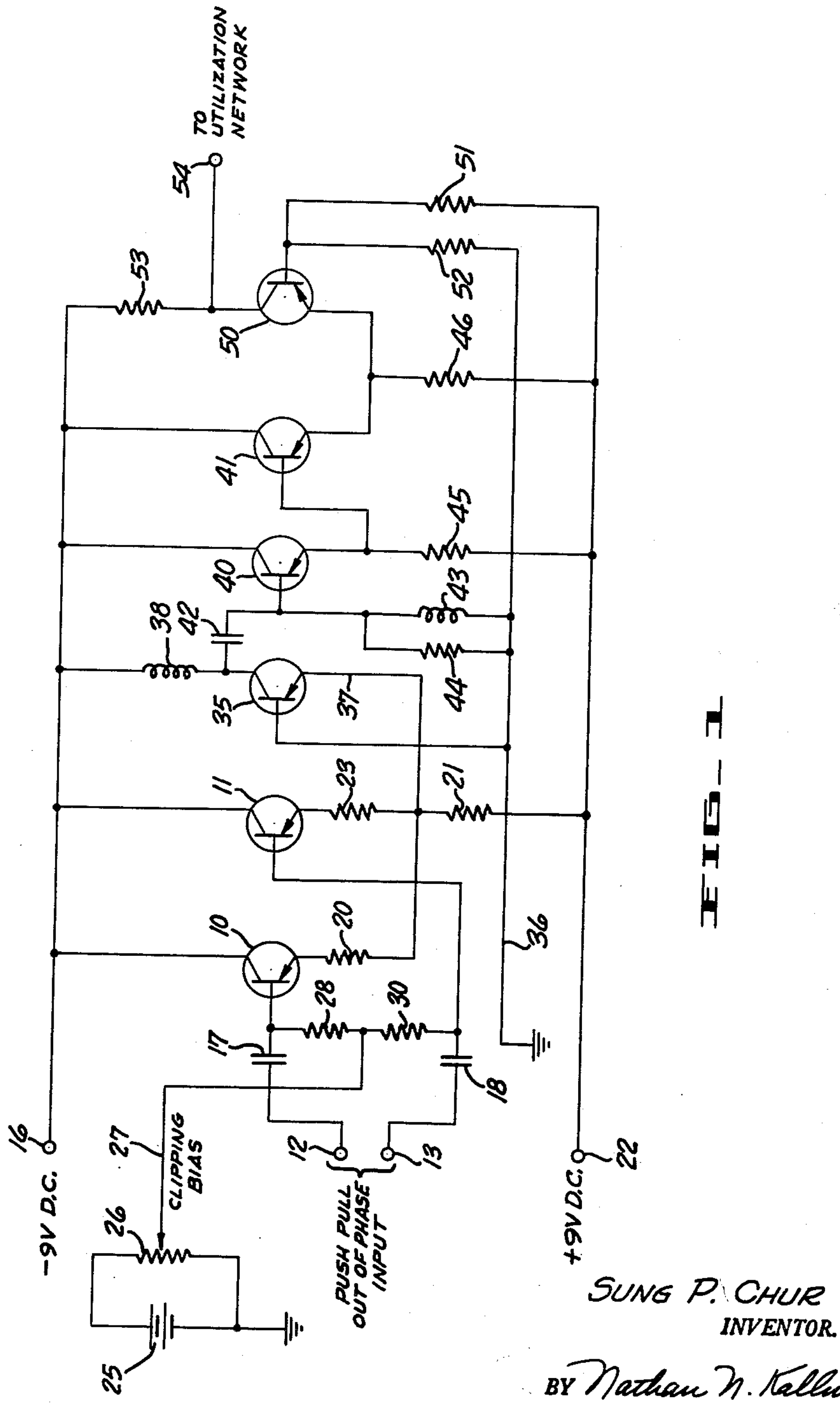

This invention relates generally to peak detector circuits and particularly relates to a transistor circuit for clipping the peaks of the read-out signal obtained from a moving magnetic storage medium and for developing sharp output pulses.

It is conventional practice in the digital computer art to store binary information on a moving magnetic medium such as a drum or tape. It is highly desirable to be able to pack the binary digits as closely as possible on the magnetic storage medium to save space. It is equally desirable to read out previously stored information as fast as possible without losing information or without obtaining erroneous read-out signals.

Binary information may be recorded with high density on magnetic tapes or the like by modern systems. Greater technical problems usually reside in obtaining a read-out signal that is free from error or ambiguity. Thus the peaks of the output wave derived from the magnetic read head associated with the magnetic medium must be clipped to discriminate against noise which causes voltage variations of a lesser amplitude than those representing a binary signal. Furthermore, these clipped peaks no longer even resemble a pulse of the type required in a digital system. Consequently, the clipped voltage peaks must be converted to sharp pulses having a leading edge which corresponds to the peak of the voltage wave.

In the non-return-to-zero method of recording binary information on a moving magnetic medium the read-out signal has both positive and negative voltage peaks. For this recording method a clipper and peak detector circuit must be devised which will clip voltage peaks of either polarity and develop sharp output pulses having a leading edge which coincides in time with the peak of the read-out voltage wave.

It is, accordingly, an object of the present invention to provide an improved peak detector which is particularly suitable for reshaping the read-out signal derived from a moving magnetic medium into output pulses suitable for use in a digital computer.

Another object of the present invention is to provide a clipper circuit which will clip voltage peaks of either polarity.

A further object of the invention is to provide a relatively simple and reliable transistor circuit suitable as a peak detector and pulse shaper.

In accordance with the present invention there is provided a transistor circuit having clippers with adjustable clipping bias to respond to amplitude peaks of either polarity. The clippers are followed by an amplifier developing an output current representative of the clipped peaks. The amplifier is followed by a differentiating circuit which develops an output voltage proportional to the rate of change of the output current and which preferably consists of one or more inductors having a damping resistor connected in parallel. The output voltage of the differentiating circuit is a voltage wave having first one polarity and then rapidly changing to the opposite polarity.

Means are provided for developing an output pulse having a leading edge which coincides in time with the zero crossing point of the differentiated voltage wave. This zero crossing point is substantially identical with the peak of the read signal derived from the moving magnetic medium, and hence the circuit assures proper timing of the output pulses. The circuit may also include one or two amplifier stages for the differentiated voltage and an output stage which is normally cut off and begins to conduct current when the differentiated voltage wave crosses the zero point, thus generating an output pulse with a leading edge occurring at the desired instant of time.

Figure 2:
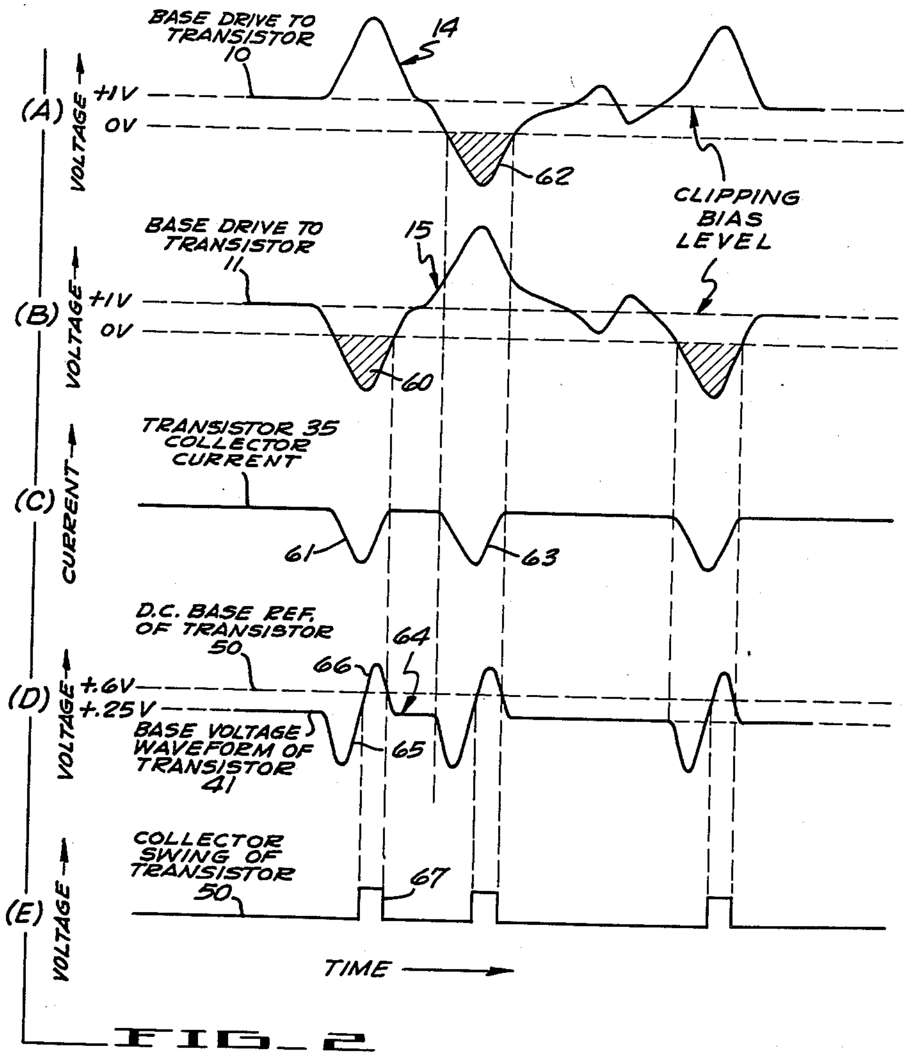

These and other objects of the present invention will be better understood from the following description, taken in connection with the accompanying drawing, in which:

FIGURE 1 is a circuit diagram of a transistor circuit embodying the present invention; and FIGURE 2 is a graph of various voltage and current waves occurring in the operation of the circuit of FIGURE 1 and plotted as a function of time.

Referring now to the drawing and particularly to FIGURE 1 there is illustrated a peak detector and pulse shaper embodying the present invention. The circuit of FIGURE 1 includes two transistors 10 and 11 which may be PNP junction transistors as indicated by their symbols. The two transistors 10 and 11 form a voltage clipper for clipping both the positive and negative peaks of an input wave applied in push-pull or out-of-phase relationship to two input terminals 12 and 13. The two out-of-phase input waves 14 and 15 which are applied to input terminals 12 and 13 respectively are illustrated in FIGURE 2. The out-of-phase input waves may be obtained by a conventional phase splitter such as an amplifier having unity gain which inverts the polarity of an input wave so as to provide two waves which are mirror images, relative to selected base lines (the +1 volt lines in the two curves of FIGURE 2).

Both transistors 10 and 11 are connected in the grounded collector configuration and accordingly the collectors of both transistors are directly connected to a source of negative voltage schematically indicated at 16. One input terminal 12 is connected to the base of transistor 10 by a coupling capacitor 17 and similarly the base of the other transistor 11 is connected to the remaining input terminal 13 by a coupling capacitor 18. The emitter of the first transistor 10 is connected by series-coupled resistors 20 and 21 to a positive source of voltage schematically indicated at 22. The emitter of the second transistor 11 is connected to the positive voltage source 22 through series-coupled resistors 23 and 21. Accordingly resistor 21 is common to the emitter circuits of both transistors 10 and 11, through resistors 20 and 23.

An adjustable source of clipping bias level is coupled to supply both transistors 10 and 11 with a clipping bias. To this end there may be provided a source of voltage 25 having its negative terminal grounded. A resistor 26 is connected across the source 25 and is provided with an adjustable tap 27 to supply an adjustable bias voltage. This clipping bias is applied to the junction between two resistors 28 and 30 connected between the bases of transistors 10 and 11. In a manner which is more fully explained below, the two transistors 10 and 11 are biased so as to be normally non-conducting in the absence of an input signal.

The clippers 10 and 11 are followed by another PNP junction transistor 35. The transistor 35 is connected in the grounded base configuration, with its base directly connected to a ground lead 36. The emitter of transistor 35 is connected by lead 37 to the junction of the resistors 23, 21. Accordingly, it will be seen that the emitter currents of the three transistors 10, 11 and 35 all flow through resistor 21. The collector of transistor 35 is connected through a load inductor 38 to the negative voltage source 16.

The transistor 35 is followed by a transistor stage 40 which is connected in the grounded collector, emitter follower configuration. Therefore the collector of transistor 40, which may be the PNP type, is directly connected to the negative voltage source 16. The base of the emitter follower transistor 40 is coupled to the collector of transistor 35 by a direct-current blocking capacitor 42 which has a negligible impedance at the signal frequencies, and the transistor 40 conducts at all times. The base of transistor 40 is grounded through an inductor 43 connected in parallel with a damping resistor 44. The inductors 38 and 43 in conjunction with the resistor 44 form a current-to-voltage differentiating network as will be more fully explained hereinafter.

The emitter of transistor 40 is connected to the positive voltage source 22 through a load resistor 45. Furthermore the emitter of transistor 40 is directly connected to the base of a transistor 41 which forms a differential pair in conjunction with another transistor 50. The emitters of transistors 41 and 50 are also connected to the positive voltage source 22 through a load resistor 46. Thus the transistors 41 and 50 may be considered as an amplifier stage for the differentiated signal impressed on the base of the transistor 40 which emerges at its emitter.

The grounded-base-coupled transistor 50 in the differential pair forms a pulse generator or shaper and may also be a PNP junction transistor as shown. Therefore, a voltage divider network consisting of resistors 51 and 52 may be connected between the positive voltage source 22 and the ground lead 36. The junction point of resistors 51, 52 is connected to the base of transistor 50. The emitter of transistor 50 is directly tied to the emitter of transistor 41 so that the emitter currents of both transistors flow through resistor 46. An output load impedance such as resistor 53 is connected between the collector of transistor 50 and the negative voltage source 16 to develop output pulses. The output pulses may be obtained from output terminal 54 and may then be fed to a utilization network. As is explained in more detail below, transistor 50 is biased so as to be normally non-conducting. Thus transistor 50 does not conduct current unless the base of transistor 41 is driven more positive than that of 50.

It will be understood that transistors 10, 11, 35, 40, 41 and 50 may be replaced by NPN junction transistors. In that case the polarity of the voltage sources should be reversed and the circuit will otherwise operate in essentially the same manner except that the polarity of the output pulses is reversed.

The circuit of FIGURE 1 operates in the following manner. It should be noted that the emitter currents of the three transistors 10, 11 and 35 all flow through the common emitter resistor 21. The emitter current of transistor 10 flows through resistor 20 and that of transistor 11 flows through resistor 23. The emitter current of transistor 35 flows only through emitter resistor 21. Since the base of transistor 35 is directly connected to ground and the emitter thereof is connected through resistor 21 to the positive voltage source 22 and hence is held at some positive voltage, the transistor 35 is normally conductive because a PNP transistor conducts current when its emitter is positive with respect to its base.

The voltage drop of transistor 35 between its emitter and base may be assumed to be about 0.25 volt. Hence the emitter of transistor 35 is normally about 0.25 volts positive. Assume here that the clipping bias applied to the bases of transistors 10 and 11 through the adjustable arm 27 of the potentiometer 26 is 1.0 volt positive. Accordingly, in the absence of an input signal both transistors 10 and 11 are cut off. As long as the emitter of transistor 35 is at +0.25 volt, the emitters of transistors 10 and 11 are also at that voltage. Because their bases are at +1.0 volt they cannot conduct current because their emitters are negative with respect to their bases.

Assume now that the out-of-phase input waves 14 and 15 shown in FIGURE 2 are applied to the two input terminals 12 and 13 respectively. Since the bases of transistors 10 and 11 are biased by the clipping bias to +1.0 volt and since the emitter-to-base voltage drop is assumed to about 0.25 volt, the transistors 10 or 11 will begin to conduct current when the input wave applied thereto is negative going and approaches 0 volt. As shown in FIGURE 2 input wave 15 first becomes negative at the shaded wave portion 60. When the part of the wave which is represented by the shaded wave portion 60 occurs, the transistor 11, to which this wave is applied, becomes conductive. Because the current through common emitter resistor 21 remains substantially constant, the current through transistor 35 must be reduced, causing a corresponding decrease in its collector or output current. This is shown at 61 in FIGURE 2 as the collector current wave of transistor 35. Similarly when the input wave 14 becomes negative as shown by shaded curve portion 62 the other clipper transistor 10 begins to conduct current. As a result the collector current of transistor 35 is reduced again as shown by curve portion 63. It will be observed that minor variations of the input waves which may be caused by noise are clipped off by the clipping bias and cause no variations in the collector current of transistor 35.

The circuit parameters of the three transistors 10, 11 and 35 are so selected that transistor 35 always conducts current and is not saturated or cut off. As a result the clipped peaks of the input wave are faithfully reproduced as shown at 61 and 63.

The output impedance as seen by the collector of transistor 35 is essentially the inductance of inductors 38 and 43, the resistance of resistor 44 and the input impedance of transistor 40, all being connected in parallel. The impedance of the blocking capacitor 42 at the signal frequencies is so small that it can be ignored. The inductors 38, 43 and the resistor 44 form a differentiating circuit which develops an output voltage corresponding to the rate of change of the collector current. The resistor 44 may further be considered a damping resistor to dampen the voltage swing across the inductors 38 and 43.

Thus the voltage impressed on the base of emitter follower transistor 40 corresponds essentially to the rate of change of the collector current of transistor 35 which is very closely proportional to the rate of change of the voltage of the clipped waveform such as 60 and 62 of the input wave. Consequently, the voltage developed across the inductors 43 and 38 is essentially the time derivative of the clipped input voltage. The reference zero crossing of the voltage appearing at the base of transistor 40 corresponds very closely to the clipped peaks of the input voltage. This positive-going zero crossing of the time derivative voltage is now detected substantially without time shift through amplifier transistors 41 and 50.

The base of the emitter follower transistor 40 is essentially at ground potential in the absence of a signal since the resistance of inductor 43 is negligible. The resistor 45 maintains the emitter of transistor 40 at about +0.25 volt. Transistor 40 as an emitter follower has a high input impedance and low output impedance with approximately unity voltage gain. The voltage divider consisting of resistors 51 and 52 has a low impedance and is proportioned to maintain the base of transistor 50 at about +0.60 volt, that is, about 0.35 volt more positive than the base of transistor 41 which is at +0.25 volt, the same potential as the emitter of transistor 40 to which it is tied. The emitters of both transistors 41 and 50 may be held at about +0.50 volt by resistor 46. As a result under static conditions transistor 41 is conductive while transistor 50 is cut off. For transistor 41 the emitter is positive with respect to its base while the base of transistor 50 is more positive than its emitter.

The differentiated wave form 64 appears at the base of transistor 41 with the same polarity as the wave impressed on the base of transistor 40. The wave 64 has a negative portion 65 and a positive portion 66 separated by the zero crossing of the wave. The negative wave portion 65 corresponds to the collector current decrease of transistor 35 as shown by current wave 61 while the positive portion 66 corresponds to the increase of collector current wave 61. Thus when the base of transistor 41 becomes more positive, the emitter of transistor 50 in the differential pair follows. Eventually the emitter of transistor 50 becomes more positive than its base which was held at +0.60 volt and transistor 50 begins to conduct current.

The resulting voltage drop across load resistor 53 of the collector of transistor 50 develops a positive output pulse shown at 67 in FIGURE 2. The leading edge of the output pulse 67 corresponds very closely to the peak of a clipped input wave such as peak 60 or 62. Thus any peak of the input wave in excess of the clipping bias will yield an output pulse having a leading edge which very closely corresponds in time to such a peak. It will be noted that the leading edge of the output pulse is somewhat later in time than the peak of the clipped wave. This is due to the fact that the transistor 50 does not begin to conduct current until its emitter is somewhat more positive than its base. As a result, the leading edge of the output pulse does not correspond exactly to the reference zero crossing but occurs a brief and predetermined time later.

There has been disclosed a transistor peak detector and pulse shaper suitable for use with a magnetic recording system to develop binary output pulses. Circuits in accordance with the invention employ transistors as the active circuit elements and find particular utility in non-return-to-zero recording systems. The circuits are simple and reliable and permit adjustment of the clipping bias to adjust to various operating conditions and noise levels. The leading edge of the output pulse closely corresponds to the peaks of the clipped input wave.

What is claimed is:

1. A peak detector and pulse shaper for developing sharp output pulses in response to voltage peaks of a signal read from a movable magnetic storage medium to reconstitute the binary pulses originally recorded on the medium, said detector and pulse shaper comprising a first transistor connected in the grounded collector configuration, means including a first and a second resistor connected in circuit with the emitter of the first transistor, means connected to the base of the transistor for maintaining the first transistor non-conductive in the absence of the signal, means for applying the signal to the base of the first transistor, a second transistor connected in the grounded base configuration, means for rendering the second transistor conducting, the emitter of the second transistor being connected between the first and second resistors whereby the emitter current paths of the transistor include the second resistor, an inductor and a third resistor connected in parallel and in circuit with the collector of the second transistor, whereby the collector current of the second transistor is representative of the clipped peaks of the signal and a differential voltage is developed across the inductor which is representative of the rate of change of the collector current, the differentiated voltage having a zero crossing point corresponding to the peak of the collector current, a third emitter follower transistor coupled to the collector of the second transistor, fourth transistor means coupled to the emitter of the third transistor and having means for biasing it to be non-conducting in the absence of a signal, a load impedance element connected in circuit with the collector of the fourth transistor, whereby the fourth transistor will conduct current in response to the differentiated voltage changing potential and develop an output pulse across the load impedance element having a leading edge corresponding substantially to the zero crossing point and hence to a peak of the detected input voltage.

2. A peak detector and pulse shaper for developing sharp output pulses in response to voltage peaks of either polarity of a push-pull signal read from a movable magnetic storage medium to reconstitute the binary pulses originally recorded on the medium, the detector and pulse shaper comprising a first and a second transistor, each being connected in the grounded collector configuration, means for maintaining the first and second transistors non-conductive in the absence of the signal and including a first resistor connected in circuit with the emitter of the first transistor and a second resistor connected in circuit with the emitter of the second transistor and a third resistor common to both of the emitter circuits, and a voltage divider connected between the bases of the transistors, said means further including a clipping bias source connected to the voltage divider, means for applying the signals in push-pull to the bases of the first and second transistors, a third transistor connected in the grounded base configuration, means for rendering the third transistor conducting, the emitter of the third transistor being connected between the first and the third resistor, whereby the emitter currents of the transistors flow through the third resistor, two inductors and a fourth resistor connected in parallel and in circuit with the collector of the third transistor, whereby the collector current of the third transistor is representative of the clipped peaks of either polarity of the signal and a differentiated voltage is developed across the inductors which represents the rate of change of the collector current, the differentiated voltage having a zero crossing point corresponding to the peak of the collector current, a fourth transistor connected in the emitter follower configuration and coupled to the collector of the third transistor, fifth and sixth transistors connected as a differential pair and each having means for biasing it to be non-conducting in the absence of a signal, a load impedance element connected in circuit with the collector of the sixth transistor, the sixth transistor being biased so that it will conduct current in response to the differentiated voltage changing potential, thereby to develop an output pulse across the load impedance element havings a leading edge corresponding substantially to the zero crossing point and hence to a peak of the detected input voltage.

3. A peak detector and pulse shaper for developing sharp output pulses in response to voltage peaks of either polarity of a push-pull signal read from a movable magnetic storage medium to reconstitute the binary pulses originally recorded on the medium in accordance with the non-return-to-zero method, the detector and pulse shaper comprising a first and a second transistor, each being connected in the grounded collector configuration, means for maintaining the first and second transistors non-conductive in the absence of a read-out signal and including a first resistor connected in circuit with the emitter of the first transistor and a second resistor connected in circuit with the emitter of the second transistor and a third resistor common to both of the emitter circuits and a resistive network connected between the bases of the transistors, said means further including a clipping bias source connected to the network for applying a predetermined clipping bias, means for applying the signals in out-of-phase relationship to the bases of the first and second transistors, a third transistor connected in the grounded base configuration, means for rendering the third transistor conducting, the emitter of the third transistor being connected between the first and third resistors whereby the emitter current paths of the transistors each include the third resistor, two inductors and a fourth resistor connected in parallel and in circuit with the collector of the third transistor, whereby the collector current of the third transistor is representative of the clipped peaks of either polarity of the signal and a differentiated voltage is developed across the inductors which corresponds to the rate of change of the collector current, the differentiated voltage having a zero crossing point corresponding to the peak of the collector current, a fourth transistor connected in the emitter follower configuration and coupled to the collector of the third transistor, fifth and sixth transistors coupled as a differential pair with the emitters of the fifth and sixth transistors being tied together and with the base of the fifth transistor being coupled to the emitter of the fourth transistor, a load impedance element connected in circuit with the collector of the sixth transistor, the base of the sixth transistor being held at a potential with respect to the base of the fifth transistor so that the sixth transistor will conduct current in response to the differentiated voltage changing potential and develop an output pulse across the load impedance element having a leading edge corresponding substantially to the zero crossing point and hence to a peak of the detected input voltage.

4. A peak detector and pulse shaper comprising a first transistor connected in the grounded collector configuration, means including first and second series resistors connected in circuit with the emitter of the first transistor, means connected to the base of said first transistor for maintaining the first transistor non-conductive in the absence of peaks of an input signal, means for applying an input signal including peaks to the base of said first transistor, a second transistor connected in the grounded base configuration, said second transistor having its emitter connected between said first and second resistors whereby the emitter current paths of said first and second transistors include said second resistor in common, means for rendering said second transistor conducting with the collector current thereof being thereby representative of clipped peaks of said input signal, differentiating means including an inductor and a resistor connected in parallel and coupled to the collector of said second transistor for developing a differentiated output voltage across said inductor representative of the rate of change of the collector current, said output voltage having zero crossing points corresponding to peaks of said collector current, and means coupled to said differentiating means in receiving relation to said differentiated output voltage for generating pulses in response to and having leading edges in coincidence with said zero crossing points.

5. A peak detector and pulse shaper for developing sharp output pulses in response to voltage peaks of either polarity of a push-pull input signal comprising first and second transistors each connnected in the grounded collector configuration, means including first and second resistors respectively connected in circuit with the emitters of said first and second transistors and a third resistor common to the emitter circuits of both transistors for maintaining the transistors non-conductive in the absence of input signal peaks of a given polarity and amplitude, means for applying an input signal in push-pull to the bases of said first and second transistors, a third transistor connected in the grounded base configuration, means for rendering said third transistor conducting, said third transistor having its emitter connected between said first and third resistors whereby the emitter currents of said first, second, and third transistors all flow through said third resistor and the collector current of said third transistor is representative of clipped peaks of both polarities of said input signal, differentiating means including an inductor and a resistor connected in parallel and coupled to the collector of said third transistor for developing a differentiated output voltage across said inductor representative of the rate of change of the collector current of said third transistor, said output voltage having zero crossing points corresponding to peaks of said collector current, and means coupled to said differentiating means in receiving relation to said differentiated output voltage for generating pulses in response to and having leading edges in coincidence with said zero crossing points.

References Cited by the Examiner

UNITED STATES PATENTS

| | | | |
|---|---|---|---|
| 2,251,973 | 8/41 | Beale et al. | 328—127 |
| 2,695,992 | 11/54 | Winger et al. | 340—174 |
| 2,717,992 | 9/55 | Weintraub | 330—31 XR |
| 3,048,717 | 8/62 | Jenkins | 307—88.5 |
| 3,054,066 | 9/62 | Crane | 330—14 |
| 3,073,968 | 1/63 | Tribby | 307—88.5 |
| 3,082,379 | 3/63 | Circuit | 328—147 |

ARTHUR GAUSS, *Primary Examiner.*

JOHN W. HUCKERT, *Examiner.*